United States Patent [19]

Hegler

[11] 4,404,844
[45] Sep. 20, 1983

[54] LEAK DETECTING METHOD

[75] Inventor: Roy E. Hegler, Forest Lake, Minn.

[73] Assignee: Duane L. Knopik, Stacy, Minn.

[21] Appl. No.: 341,854

[22] Filed: Jan. 22, 1982

[51] Int. Cl.$^3$ ............................................. G01M 3/32
[52] U.S. Cl. .................................................... 73/49.2
[58] Field of Search ........................ 73/49.2, 301, 723

[56] References Cited

U.S. PATENT DOCUMENTS

| | | | |
|---|---|---|---|
| 3,537,298 | 11/1970 | Kapff .................................... | 73/49.2 |
| 3,538,745 | 11/1970 | Wright et al. ........................ | 73/49.2 |
| 3,538,746 | 11/1970 | Jacobs et al. ........................ | 73/49.2 |
| 3,841,146 | 10/1974 | Cross et al. ......................... | 73/49.2 |
| 4,353,245 | 10/1982 | Nicolai ................................. | 73/49.2 |

FOREIGN PATENT DOCUMENTS 2637560  2/1978  Fed. Rep. of Germany ....... 73/49.2

*Primary Examiner*—James J. Gill
*Assistant Examiner*—Joseph W. Roskos
*Attorney, Agent, or Firm*—Richard Francis

[57] ABSTRACT

This invention provides a method for detecting loss by leakage of liquid from a liquid-containing vessel by employing a submersible diaphragm-type pressure transducer having an integral operational amplifier in an appropriate electrical connection with a suitable power supply and digital volt meter. The method comprises steps of placing the transducer into the vessel beneath the surface of the liquid, energizing the operational amplifier to obtain an initial electrical output, recording the initial electrical output with a digital volt meter, adjusting the liquid volume of the vessel by a predetermined amount, (i.e., by adding or removing a known volume of liquid), recording the electrical output of the operational amplifier after the volume adjustment, calculating a calibration factor by dividing the adjusted volume by the difference in electrical output, recording the electrical output at the beginning of a predetermined period of time, recording the electrical output at the end of the predetermined period of time, recording the electrical output at the end of the predetermined period of time, and calculating the volume of liquid lost by subtracting the electrical output at the end of the predetermined period of time from the electrical output at the beginning of the predetermined period of time and multiplying the result by the calibration factor.

1 Claim, 1 Drawing Figure

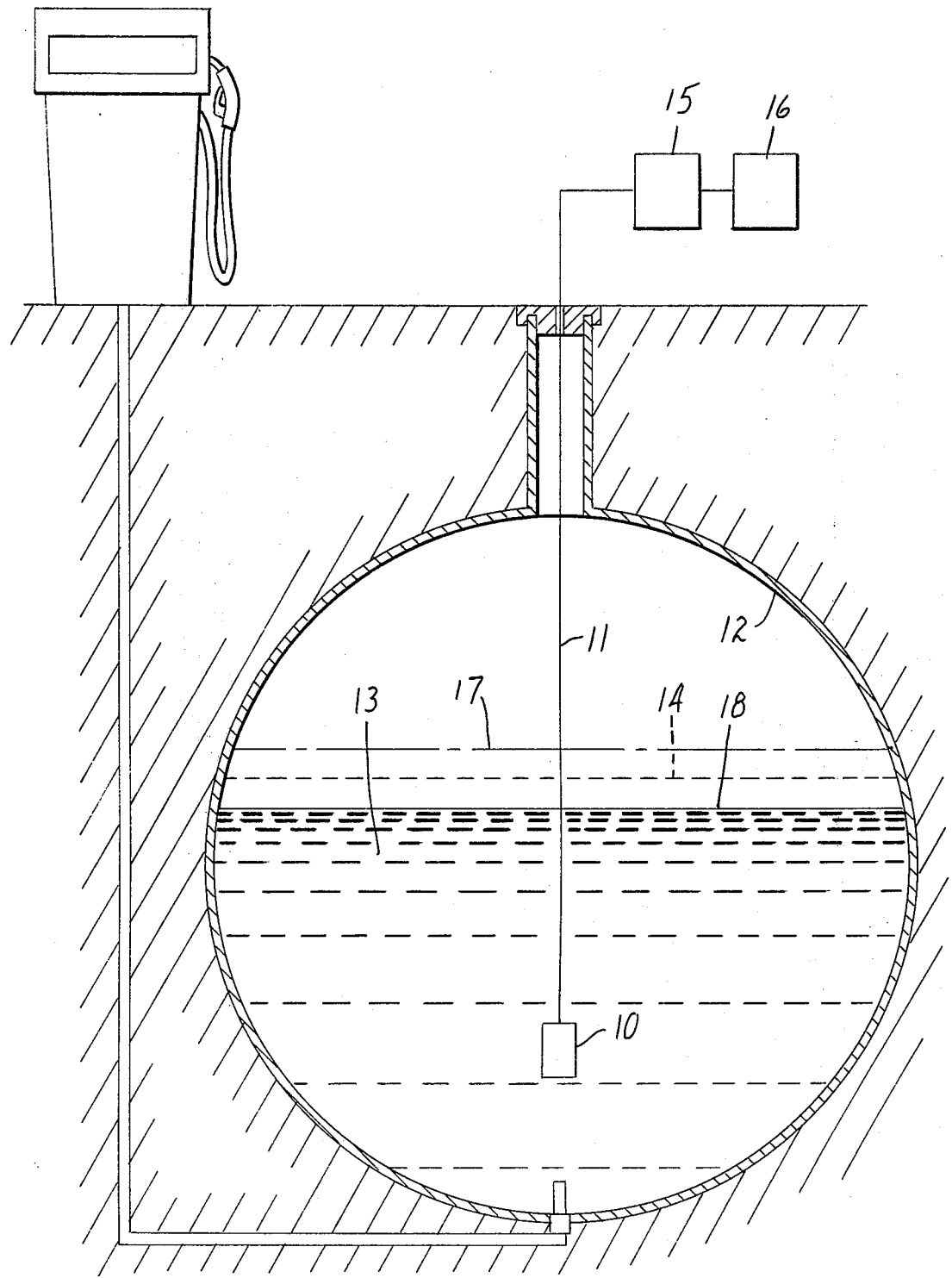

LEAK DETECTING METHOD

DESCRIPTION

1. Technical Field

This invention relates to a method and apparatus for detecting leaks in tanks which contain liquid. More specifically, the method utilizes a pressure transducer as a sensing element.

2. Background Art

With the proliferation of the use of the automobile and other motor vehicles, there has been a corresponding proliferation of service stations to provide fuel for such vehicles. Most service stations employ a tank which is typically positioned underground as a means of storing fuel which is pumped therefrom through appropriate conduits by a pump and into the motor vehicle fuel tank. Many underground storage tanks have been in place for long periods of time without problems such as leakage. The others, however, have developed leaks either because of oxidation, the corrosive action of dissolved minerals in the ground water, movements in the earth, weakened or bad seams, and for many other reasons. Some leaks are readily detected because of the rapid loss of the contents of the tank or because of the infiltration of the tank contents into noticeable adjacent areas such as into the basements of adjacent homes, underground sewer lines and in other areas. Other leaks, however, are extremely difficult to discover due to the minimal quantity of fuel lost. In fact, some leaks are intermittent, leaking only under the pressure of a filled tank or under certain atmospheric conditions, for example, when the weather is extremely warm or extremely cold, respectively causing expansion or contraction in the tank or in the adjacent soil.

Fuel leakage causes many problems. The escaped fuel becomes a dangerous fire hazard which could threaten adjacent buildings or cause a fire in an underground sewer line or in other areas. Loss of the fuel causes an economical burden to the owner of the fuel tank because of the loss of the fuel and because of the cost of the clean up operation. Fuel leakage may even cause the ground water to become contaminated. Not only is there a danger of fire because of leaked fuel, but there is also a very repugnant odor associated with the fuel which could cause nausea, illness and could prevent occupants of a home having a fuel-contaminated basement from entering the same because of the odor.

Various methods and apparatus for detecting underground fuel storage tank leakage having been proposed or utilized, but they all have suffered from one or more deficiencies. For example, a method accepted by the American Petroleum Institute calls for completely filling the tank to be tested with fuel, attaching a calibrated transparent tube to the tank's fill pipe, filling the transparent tube to a designated level, stirring the fuel in the tank to maintain uniform temperature throughout, and observing the liquid level in the tube over a specified period of time to determine the drop in liquid level, if any. Because of the tank wall flexibility (typically the end walls in a cylindrical tank), complete filling of the tank and the calibrated tube may cause the tank to bulge which in effect increases the tank volume and thus gives a false leakage reading. The additional pressure may also cause a tank having a weakened wall to leak. Allowances in the afore-described test method must thus be made for tank bulging. Because the bulging is not necessarily uniform from tank to tank, one cannot be certain whether or not the tank is leaking or whether it merely bulged during the test.

Other methods of detecting leakage in fuel tanks are also known. For example, Kapff (U.S. Pat. No. 3,537,298) discloses a method which does not require filling the tank to capacity, but employs a chamber within the tank adapted to receive liquid. A port in the chamber provides a means for allowing liquid to flow into or from the chamber and the port has a detector to monitor the flow through the port. The chamber is filled while in communication with the liquid in the tank and a valve is closed to isolate the chamber from the remaining liquid. After a predetermined period of time, the valve is opened and the liquid in the chamber, which contains suspended particles or other matter so that it is different from the liquid in the tank, if leakage has occurred, will flow through the port until the liquid level in the chamber is the same as in the tank.

Jacobs et al.(U.S. Pat. No. 3,538,746) employs a pressure chamber utilized in conjunction with a differential pressure gauge to determine leakage.

Each of the foregoing devices requires complicated procedures or apparatus to be inserted into the storage tank. Such apparatus is prone to failure or error and is therefore not convenient or reliable to use.

DISCLOSURE OF THE INVENTION

The present invention provides a method for determining leakage in storage tanks containing liquid fuel which avoids the above-mentioned problems. The present method does not require that the tank be filled to capacity for the test. The present method employs a simple apparatus which does not require the isolation or trapping of any volumes of liquid but instead utilizes a simple detecting element which may be lowered into the tank at the end of an electrical conductor.

The method of the present invention comprises the steps of placing into a liquid-containing vessel beneath the surface of the liquid a submersible diaphragm-type pressure transducer having an integral operational amplifier, energizing the operational amplifier to obtain an initial electrical output, recording the initial electrical output with a digital volt meter, adjusting the liquid volume of the vessel by a predetermined amount (i.e., by adding or removing liquid), recording the change in the electrical output of the operational amplifier after the volume adjustment, calculating a calibration factor by dividing the adjusted volume by the difference in electrical output, recording the electrical output at the beginning of a predetermined period of time, recording the electrical output at the end of the predetermined period of time, and calculating the volume of liquid lost by subtracting the electrical output at the end of the predetermined period of time from the electrical output at the beginning of the predetermined period of time and multiplying the result by the calibration factor.

The apparatus employed in carrying out the invention includes a submersible diaphragm-type pressure transducer having an integral operational amplifier which is suited for use in the designated environment, a digital volt meter, and a power supply for operating the operational amplifier.

BRIEF DESCRIPTION OF THE DRAWING

The FIGURE is a schematic drawing illustrating the method of the present invention for testing an underground gasoline storage tank for leakage.

BEST MODE FOR CARRYING OUT THE INVENTION

As shown in the FIGURE, a submersible diaphragm-type pressure transducer 10 having an integral operational amplifier (not shown separately) is lowered by its electrical lead 11 into an underground liquid fuel storage tank 12 containing fuel 13, having an initial liquid level 14. Electrical lead 11 is connected to digital volt meter 15 and power supply 16 by appropriate connections so that, when the operational amplifier of pressure transducer 10 is energized by power supply 16, an initial electrical output is obtained and displayed by digital volt meter 15 in a numerical display. After the initial electrical output is obtained, the volume of the liquid fuel in the storage tank is adjusted by either adding or removing a known quantity of liquid fuel, e.g., 5 gallons. If liquid is added, the liquid level will increase to level 17 and the increase will cause the corresponding increase in the electrical output of the operational amplifier of transducer 10 which will be reflected by an increased numerical display on volt meter 15. A calibration factor will be obtained by dividing the adjusted volume by the change in electrical output. The calibration should be accomplished fairly rapidly to avoid any error which may be caused by tank leakage.

The electrical output of the operational amplifier of transducer 10 at the beginning of a predetermined period of time is then recorded. If the tank is leaking, the liquid level will be at lower level 18 at the end of the predetermined period of time. The electrical output at the end of the predetermined period of time is also recorded and the output at the end of the predetermined period of time is subtracted from the output at the beginning of the predetermined period of time to obtain a difference which is then multiplied by the calibration factor to determine the volume of liquid lost for the predetermined period of time.

A suitable digital volt meter for use in the claimed method is sold by the United Systems Corporation under the trade designation "Digitec" Model No. 2780A-03 with an "E" option. That device has a range of plus or minus 19.999 volts with a resolution of one microvolt. A suitable transducer is a strain gauge pressure transducer available from Sensotec, Inc. as Model No. 316SS with TJE submersible conductor connector and an internal transducer electronic amplifier Model TJE. That transducer has a gauge pressure range of zero to 3 psi.

I claim:

1. Method of detecting leakage in a vessel containing liquid, comprising the steps of:
   (a) placing into said vessel beneath the surface of said liquid a submersible diaphragm-type pressure transducer having an integral operational amplifier;
   (b) energizing said operational amplifier to obtain an initial electrical output;
   (c) recording said initial electrical output;
   (d) adjusting the liquid volume of said vessel by a predetermined amount;
   (e) recording the electrical output after the adjustment in volume;
   (f) calculating a calibration factor by dividing the adjusted volume by the change in electrical output;
   (g) recording the electrical output at the beginning of a predetermined period of time;
   (h) recording the electrical output at the end of said predetermined period of time; and
   (i) calculating the volume of liquid lost by subtracting the electrical output at the end of said predetermined period of time from the electrical output at the beginning of said predetermined period of time and multiplying the result by said calibration factor.

* * * * *